United States Patent [19]

Higashiura et al.

[11] Patent Number: 5,449,707
[45] Date of Patent: Sep. 12, 1995

[54] AQUEOUS DISPERSION OF POLYESTER

[75] Inventors: Shinya Higashiura; Minoru Wada; Toshiyuki Shimizu, all of Otsu; Yukari Yamamoto, Imabari, all of Japan

[73] Assignee: Toyo Boseki Kabushiki Kaisha, Osaka, Japan

[21] Appl. No.: 177,270

[22] Filed: Jan. 4, 1994

[30] Foreign Application Priority Data

Jan. 5, 1993 [JP] Japan ................... 5-000250

[51] Int. Cl.$^6$ ............................. C08L 67/06
[52] U.S. Cl. .................. 523/501; 524/504; 525/48
[58] Field of Search ............ 524/504; 523/501; 525/48

[56] References Cited

U.S. PATENT DOCUMENTS 5,156,651 10/1992 Girardeau et al. .............. 8/115.6

FOREIGN PATENT DOCUMENTS 57-38810 3/1982 Japan .
61-200109 9/1986 Japan .
63-46237 2/1988 Japan .
3-273015 12/1991 Japan .

*Primary Examiner*—Ana L. Carrillo
*Attorney, Agent, or Firm*—Leydig, Voit & Mayer, Ltd.

[57] ABSTRACT

An aqueous dispersion of a graft-copolymer (A), dispersed in water or a mixed solvent (B) of water and a water-soluble organic solvent, the graft-copolymer (A) comprising a polyester (A-a) graft-polymerized with a radical copolymerizable monomer (A-b) comprising a radical copolymerizable monomer having a hydrophilic group, wherein said graft-copolymer (A) is dispersed as fine particles having an average particle size of not more than 500 nm and a half band width of a signal of a carbon of a carbonyl group of the polyester, as determined by $^{13}$C-NMR, is not less than 300 Hz. The aqueous polyester dispersion of the present invention is superior in re-dispersibility and when a paint prepared from the dispersion is coated on a metal or a plastic, the coated film shows superior appearance, processability and water resistance. Accordingly, the aqueous dispersion of the present invention serves well for use for paints, ink, coating agents, adhesives and various treating agents.

16 Claims, 4 Drawing Sheets

AQUEOUS DISPERSION OF POLYESTER

TECHNICAL FIELD OF THE INVENTION

The present invention relates to an aqueous dispersion of a copolymerization polyester. More specifically, the present invention relates to an aqueous dispersion of copolymerization polyester particles having a particle size permitting good re-dispersibility (rewet) and superior storage stability, which is useful as a vehicle for paints, ink, coating agents, adhesives etc. and as a treating agent for fibers, films, paper products or the like.

BACKGROUND OF THE INVENTION

While high molecular weight copolymerization polyesters have been acknowledged of their usefulness and are used in the above-mentioned fields of utilization, particularly in the fields requiring superior flexibility and superior adhesion to various substrates, they are mostly used upon dissolution in an organic solvent.

There are already known many methods for making low molecular weight copolymerization polyesters dispersible or soluble in aqueous media by graft polymerization. For example, U.S. Pat. No. 3,634,351, 4,517,322 and Japanese Patent Publication No. 57065/1982 disclose such techniques. flowever, the target polyesters in these references are alkyd resins having very low molecular weights and a film obtained from an aqueous dispersion of such a polyester has inferior processability and poor water resistance.

The methods for making high molecular weight copolymerization polyesters dispersible or soluble in aqueous media are disclosed in Japanese Patent Publication No. 57874/1986 and Japanese Patent Unexamined Publication Nos. 223374/1984, 225510/1987 and 294322/1991. Yet, those methods are industrially disadvantageous in that a crosslinking reaction causing gelation occurs as a side reaction, only reactions and uses at low solid concentrations are attainable, procedures are complicated due to the steps to introduce a double bond into terminal of copolymerization polyester, reactions are hard to control, productivity is low and or the like.

In view of the situation as described, the present invention aims at forming, without adding an emulsifier, an aqueous dispersion of fine polyester particles permitting good re-dispersibility by dispersing the particles in water or an aqueous solvent with a sufficiently low content of an organic solvent, which dispersion being stable even at high solid concentrations, as well as providing an aqueous dispersion of a graft-polymerized polyester satisfying extremely high levels of processability and adhesion to a substrate as those possessed by a raw material polyester and preventing gelation caused by crosslinking reaction.

SUMMARY OF THE INVENTION

In accordance with the present invention, there is provided an aqueous dispersion of a graft-copolymer (A) dispersed in water or a mixed solvent (B) of water and a water-soluble organic solvent, the graft-copolymer (A) comprising a polyester (A-a) graft-polymerized with a radical copolymerizable monomer (A-b) comprising a radical copolymerizable monomer having a hydrophilic group, wherein said graft-copolymer (A) is dispersed as fine particles having an average particle size of not more than 500 nm and a half band width of a signal of a carbon of a carbonyl group of the polyester, as determined by $^{13}C$-NMR, is not less than 300 Hz.

DETAILED DESCRIPTION OF THE INVENTION

Figure 1:
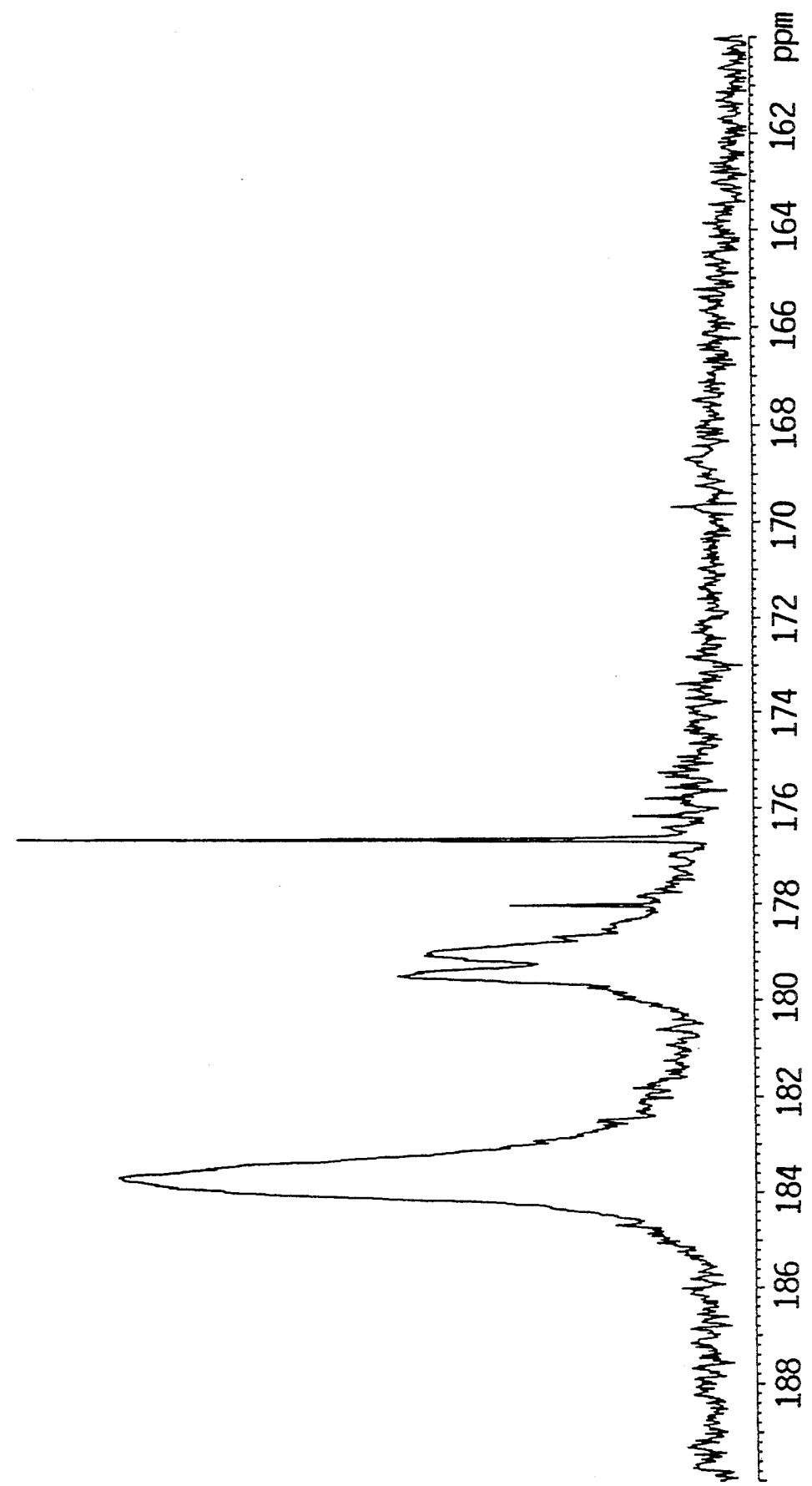
FIG. 1 is a chart showing 125 MHz $^{13}C$ NMR of an aqueous dispersion of Example 1.
Figure 2:
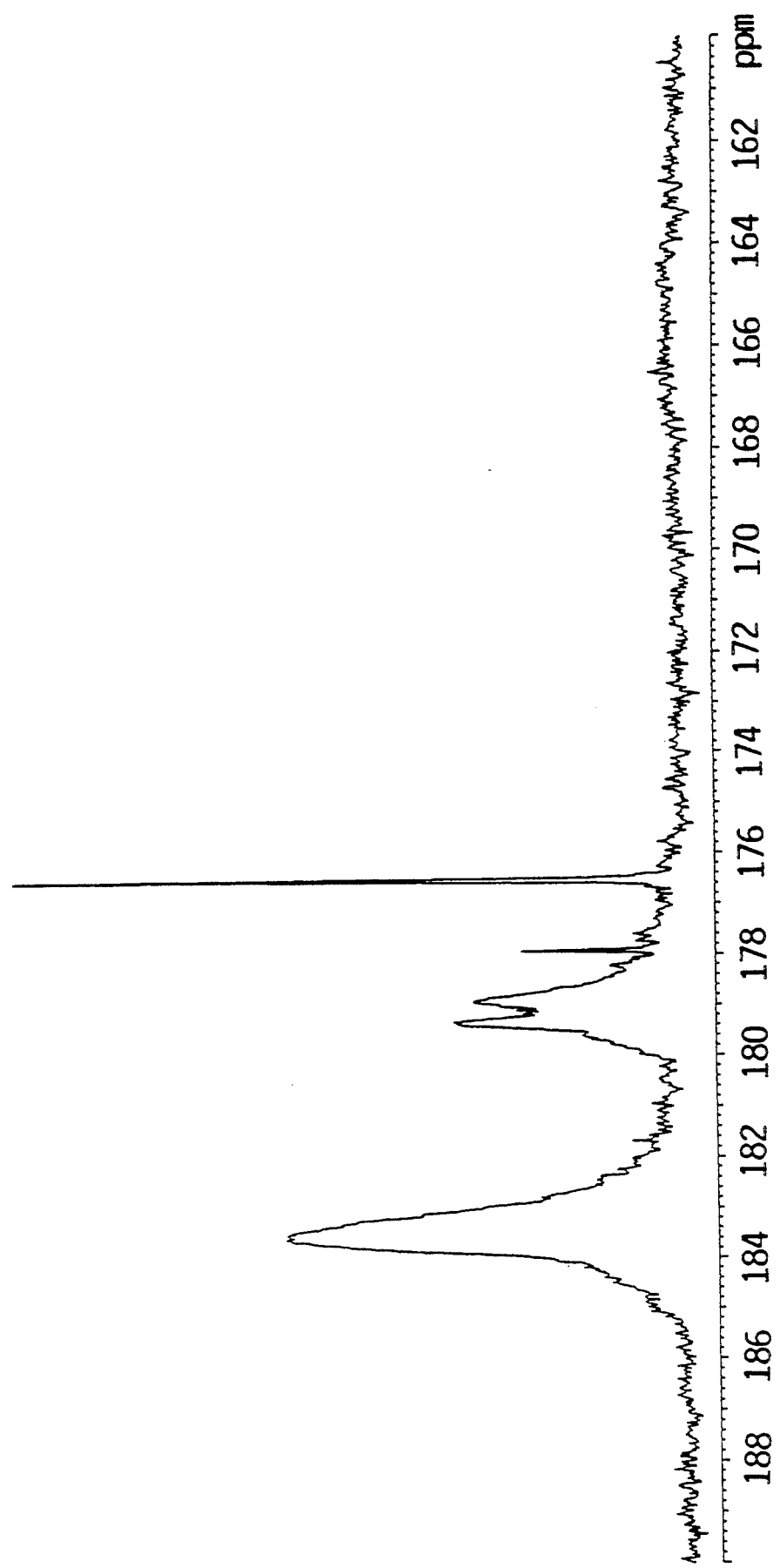
FIG. 2 is a chart showing 125 MHz $^{13}C$ NMR of an aqueous dispersion of Example 2.
Figure 3:
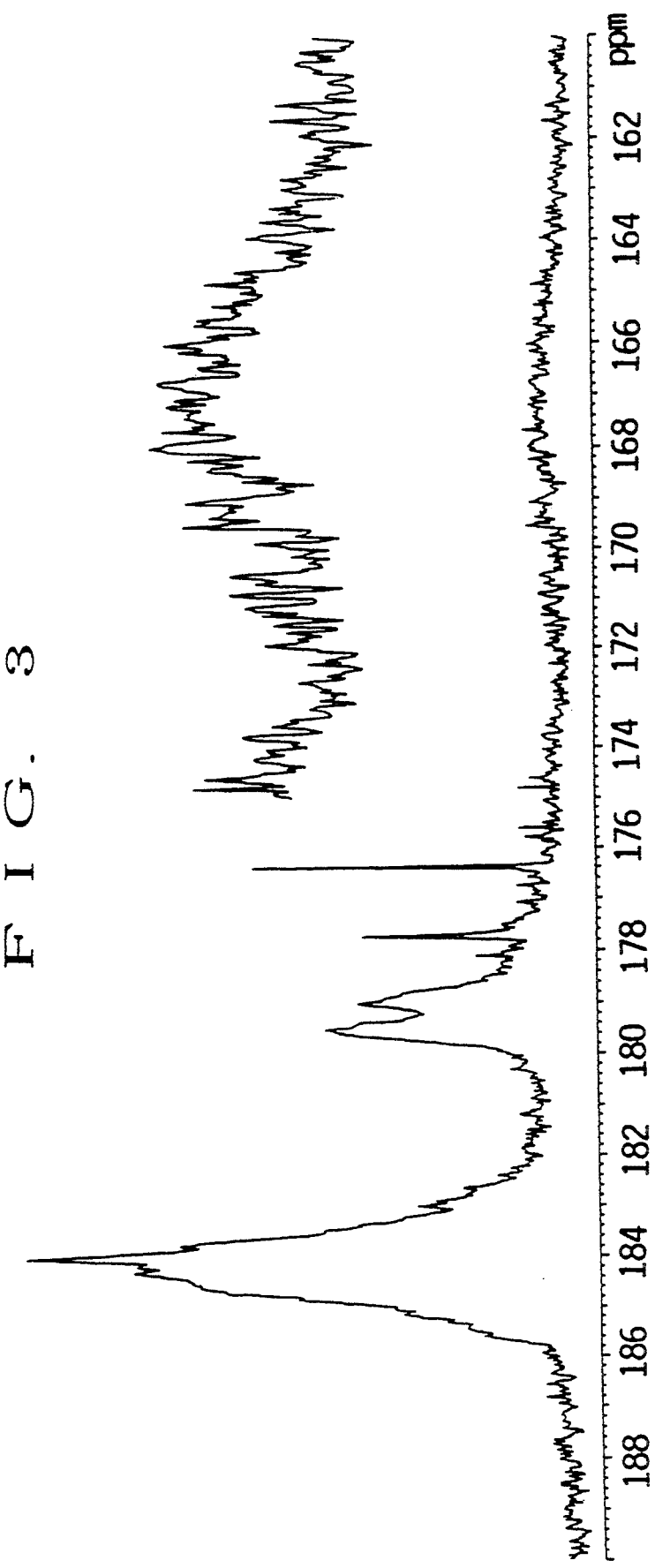
FIG. 3 is a chart showing 125 MHz $^{13}C$ NMR of an aqueous dispersion of Example 5.
Figure 4:
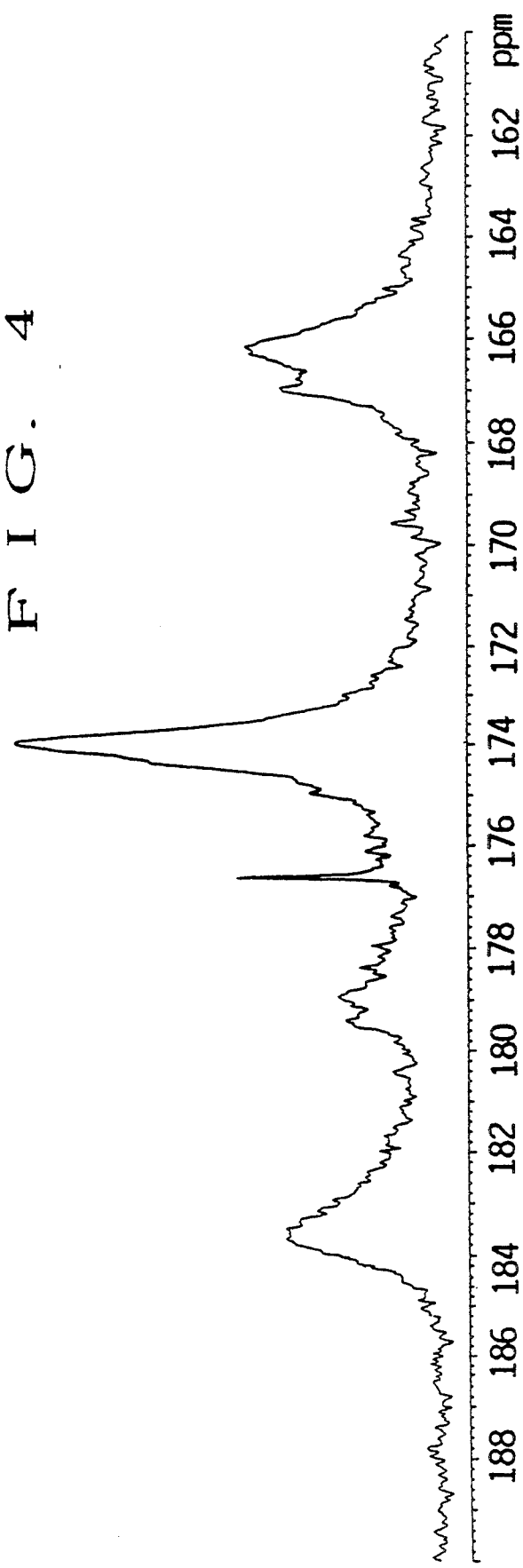
FIG. 4 is a chart showing 125 MHz $^{13}C$ NMR of an aqueous dispersion of Comparative Example 11.

In the aqueous polyester dispersion of the present invention, the graft-copolymer (A) can be stably dispersed at fine particle sizes and high content in an aqueous solvent without using an emulsifier, since it exhibits self-emulsifiability. In addition, a film formed by drying at a temperature near room temperature or by air drying can be redispersed in water or an aqueous dispersion (re-dispersibility). When used for a coating agent, paint, ink etc., the aqueous dispersion of the invention exhibits various advantageous characteristics such as superior adhesion to substrates, and enables forming of a film having water resistance, solvent resistance, good processability, smoothness etc.

Polyester (A-a)

Preferably, the polyester (A-a) in the present invention inherently does not disperse or dissolve in water by itself and has a molecular weight of 5,000-50,000. The preferable polymerization composition of an entire acid component is 60-99.5% by mole of an aromatic dicarboxylic acid, 0-40% by mole of an aliphatic and/or alicyclic dicarboxylic acid and 0.5-10% by mole of a dicarboxylic acid having a polymerizable unsaturated double bond. Examples of the aromatic dicarboxylic acid include terephthalic acid, isophthalic acid, orthophthalic acid, naphthalenedicarboxylic acid, biphenyldicarboxylic acid and so on. Where necessary, sodium 5-sulfoisophthalate may be used. Examples of the aliphatic dicarboxylic acid include succinic acid, adipic acid, azelaic acid, sebacic acid, dodecanedioic acid, dimeric acid and so on and examples of the alicyclic dicarboxylic acid include 1,4-cyclohexanedicarboxylic acid, 1,3-cyclohexanedicarboxylic acid, 1,2-cyclohexanedicarboxylic acid and acid anhydrides thereof.

The aromatic dicarboxylic acid in the dicarboxylic acid component is more preferably 70-99.5% by mole and the aliphatic dicarboxylic acid and/or alicyclic dicarboxylic acid are/is more preferably 0-30% by mole. When the aromatic dicarboxylic acid is not less than 60% by mole, processability of the film and resistance to blister of the film upon retort treatment can be suitably maintained. When the aliphatic dicarboxylic acid and/or the alicyclic dicarboxylic acid dodoes not exceed 40% by mole, hardness, resistance to soil and retort resistance can be suitably maintained and a problem of lowered polymerization degree of polyester during storage as an aqueous dispersion or a paint composition, which is caused by inferior resistance to hydrolysis possessed by an aliphatic ester bond to that of an aromatic ester bond, can be avoided.

In the present invention, the dicarboxylic acid having a polymerizable unsaturated double bond is used for grafting a radical polymerizable monomer (A-b) to be mentioned later in the preparation of a polyester (A-a). Examples of the dicarboxylic acid having a polymerizable unsaturated double bond include α, β-unsaturated dicarboxylic acids, such as fumaric acid, maleic acid, maleic anhydride, itaconic acid and citraconic acid and alicyclic dicarboxylic acids having an unsaturated double bond such as 2,5-norbornenedicarboxylic anhydride and tetrahydrophthalic anhydride, with preference given to fumaric acid, maleic acid and 2,5-norbornenedicarboxylic acid [endo-bicyclo-(2,2,1)-5-heptene-2,3-dicarboxylic acid].

The dicarboxylic acid having a polymerizable unsaturated double bond is preferably contained in a proportion of 0.5–10% by mole, more preferably 2–7% by mole and most preferably 3–6% by mole relative to the entire acid component. When the dicarboxylic acid having a polymerizable unsaturated double bond is contained in a proportion of between 0.5% by mole and 10% by mole, various advantages can be attained such that grafting of a radical polymerizable monomer onto a polyester (A-a) proceeds efficiently, the size of the dispersed particles tends to be maintained in an aqueous solvent, thereby affording superior dispersion stability and an excessive rise in viscosity to prevent uniform progress of graft polymerization during the later stage of the polymerization can be prevented.

The glycol component comprises at least one of aliphatic glycol having 2 to 10 carbon atoms, alicyclic glycol having 6 to 12 carbon atoms and ether-bonded glycol. Examples of the aliphatic glycol having 2 to 10 carbon atoms include ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol and so on and examples of the alicyclic glycol having 6 to 12 carbon atoms include 1,4-cyclohexanedimethanol and so on.

Examples of the ether-bonded glycol include diethylene glycol, triethylene glycol, dipropylene glycol, glycols obtainable by adding 1 to several moles of ethylene oxide or propylene oxide to to phenolic hydroxyl groups of bisphenols, such as 2,2-bis(4-hydroxyethoxyphenyl)propane and so on. Where necessary, polyethylene glycol, polypropylene glycol and polytetramethylene glycol may be used.

A polycarboxylic acid and/or a polyol both having three or more functional groups may be copolymerized into a polyester (A-a). Examples of polycarboxylic acid having three or more functional groups include trimellitic acid(anhydride), pyrromellitic acid(anhydride), benzophenonetetracarboxylic acid(anhydride), trimesic acid, ethylene glycol bis(anhydrotrimellitate), glycerol tris(anhydrotrimellitate) and so on. The polyol having three or more functional groups is exemplified by glycerol, trimethylolethane, trimethylolpropane, pentaerythritol or the like. The polycarboxylic acid and/or the polyol both having three or more functional groups are/is copolymerized at a proportion of 0–5% by mole, preferably 0–3% by mole relative to the entire acid component or the entire glycol component, wherein a proportion not exceeding 5% by mole contributes to better processability.

Radical copolymerizable monomer (A-b)

The radical copolymerizable monomer (A-b) to be graft-polymerized onto a polyester (A-a) comprises radical polymerizable monomers having a hydrophilic group including a group which can be converted to a hydrophilic group at a later stage and other radical polymerizable monomers.

The hydrophilic group may be, for example, carboxyl group, hydroxyl group, phosphoric acid group, phosphorous acid group, sulfonic acid group, amide group, quaternary ammonium salt or the like and the group which can be converted to a hydrophilic group may be, for example, an acid anhydride group, glycidyl, chlorine group or the like.

Of these hydrophilic groups, carboxyl group is preferable due to easy control of its dispersibility in water by varying acid value. Also, a radical polymerizable monomer having a carboxyl group or a group which can be converted to a carboxyl group is preferable.

The radical polymerizable monomer having a carboxyl group having an easily adjustable acid value, which can be graft-polymerized to a polyester (A-a), may be, for example, acrylic acid, methacrylic acid, maleic acid, fumaric acid, itaconic acid, citraconic acid or maleic anhydride, itaconic anhydride or methacrylic anhydride which can be easily converted to carboxylic acid upon contact with an aqueous alkaline medium or combinations thereof. The most preferable radical polymerizable monomers having a carboxyl group are acrylic acid, methacrylic acid and maleic anhydride.

When practising the present invention, a radical polymerizable monomer without a hydrophilic group is usually used along with the above-mentioned radical polymerizable monomer having a hydrophilic group. Examples of the radical polymerizable monomer without a hydrophilic group include a wide variety of radical polymerizable monomers, such as esters of acrylic acid and methacrylic acid (e.g. methyl acrylate, ethyl acrylate, isopropyl acrylate, n-butyl acrylate, 2-ethylhexyl acrylate, 2-hydroxyethyl acrylate, hydroxypropyl acrylate, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, hydroxypropyl methacrylate) and the like. In addition, known monomers include, for example, acrylonitrile, methacrylonitrile, acrylamide, N-methylolacrylamide, diacetoneacrylamide, vinyl acetate, vinyl ethers, N-vinylpyrrolidone, styrene, α-methylstyrene, t-butylstyrene and vinyltoluene, which may be used alone or in combination.

It is preferable that the number of components in a radical copolymerizable monomer (A-b) should be 2 or more. When the number is 1 and only a monomer having a hydrophilic group is used, grafting to a polyester (A-a) chain does not proceed smoothly and good water dispersion is hardly obtained. An efficient grafting can be attained only by a copolymerization using an ester of acrylic acid or methacrylic acid (which is a second component).

An application of a radical copolymerization theory offers a useful index for the selection of a monomer from those recited above. For example, by applying Q and e values of dietheyl fumarate (monomer 1) and each monomer (monomer 2) [for example, Polymer Handbook, 3rd ed. John Wiley and Sons (1989)] to the equation:

$$r_2 = Q_2/Q_1 \exp[-e_2(e_2-e_1)],$$

copolymerization reactivity ratio of monomer 2 to the diethyl fumarate, monomer 1, (hereinafter referred to as $r_2$ value) can be calculated.

A scrupulous investigation of the present inventors resulted in prediction of reactivity, specifically of graft efficiency and gelation by crosslinking reaction, of a polyester (A-a), wherein either fumaric acid, maleic acid or 2,5-norbornenedicarboxylic acid is copolymerized, and a radical copolymerizable monomer (A-b) on the basis of a copolymerization reactivity ratio of various monomers to diethyl fumarate. Namely, it has been found that gelation can be avoided when a monomer mixture (A-b) of monomers having an $r_2$ value of from more than 1 to 12, such as acrylic acid, methacrylic acid, esters thereof, nitriles thereof, amides thereof from the monomers recited above, is subjected to a grafting by dropwise addition, whereas concomitant use of a monomer having an $r_2$ value of not more than 1 such as styrene, vinyl acetate, vinyl ether or N-vinylpyrrolidone having an $r_2$ value of a $10^{-1}-10^{-4}$ order frequently causes crosslinking of graft copolymer during the graft polymerization.

Furthermore, the present inventors have investigated the use of monomers having an $r_2$ value of not more than 1 and found the following. That is, graft polymerizations of styrenes, vinyl esters, vinyl ethers or the like, which have an $r_2$ value of not more than 1 and are highly electron donative, with a polyester (A-a) in the presence of a monomer having low self-polymerizability and high electron acceptability such as maleic anhydride, difumarate or dimaleate results in very smooth graft polymerization, absence of gelation and production of good water dispersion by subsequent reaction with an aqueous alkaline medium.

In this case, a graft chain is an alternative copolymerization chain of an electron acceptive monomer and an electron donative monomer, making a contrast to a random copolymerization graft chain consisting of the above-mentioned monomers having an $r_2$ value of from more than 1 to 12. The prior art references as mentioned in the foregoing descriptions do not teach this kind of a graft polymer.

The proportion of a radical polymerizable monomer having a hydrophilic group and a monomer without a hydrophilic group is 95/5-5/95, preferably 90/10-10/90 by weight, which should be selected in consideration of the acid value (which is obtained by the following equation) of a graft-copolymer (A).

Acid value (eq./$10^6$ g)=Equivalent of carboxyl group in $10^6$ gram of graft-copolymer (A)

The total acid value of the graft-copolymer (A) of the present invention prior to neutralization is preferably 600–4000 eq./$10^6$ g, more preferably 700–3000 eq./$10^6$ g and most preferably 800–2500 eq./$10^6$ g. When the acid value is not less than 600 eq./$10^6$ g, a dispersion containing finely-divided particles can be obtained and dispersion stability tends to become desirable. When the acid value is not more than 4000 eq./$10^6$ g, the water resistance of the film formed from the water dispersion also tends to become desirable.

Graft polymerization

A graft-copolymer (A) is generally obtainable by reacting a polyester (A-a) dissolved in an organic solvent with a radical polymerizable monomer (A-b) in the presence of a radical initiator. In the present invention, the reaction mixture of graft polymerization composed of three main products, the desired graft-copolymer (A), unreacted polyester (A-a) and ungrafted radical polymerizable monomer (A-b) is included.

The content of the two unreacted polymers has been analyzed and found to be relatively small. As used herein, the term "graft-copolymer (A)" means that including ungrafted polymers.

When the proportion of the graft copolymer (A) in the graft coplymerization product is small and that of the unreacted polyester and the ungrafted radical monomer is large, an aqueous dispersion superior in stability cannot be obtained.

Mode of graft polymerization

When practicing graft polymerization of a polyester (A-a) and a radical polymerizable monomer (A-b), a radical polymerizable monomer (A-b) and a radical initiator may be added at the same time to a polyester (A-a) dissolved in a solvent under heating or may be dropwise added separately over a certain period of time and heating may be continued while stirring for a predetermined time to allow reaction. Where necessary, one or more monomers contained in the monomer component (A-b) is(are) added at once in advance, the rest of the monomers and an initiator are dropwise added separately over a certain period of time and heating is continued while stirring for a predetermined time to allow reaction.

Prior to polymerization, a polyester (A-a) and a solvent are charged in a reactor and heated while stirring to dissolve the polyester (A-a). The weight ratio of the polyester (A-a) and the solvent is preferably from 70/30 to 30/70.

The weight ratio is adjusted to such a ratio that permits uniform reaction during the polymerization procedure, in consideration of the reactivity and solubility in a solvent of a polyester (A-a) and a radical polymerizable monomer (A-b).

The graft polymerization is preferably carried out at a temperature between 50° C. and 120° C.

The weight ratio of a polyester (A-a) and a radical polymerizable monomer (A-b), which meets the object of the present invention, is 40/60-95/5, preferably 55/45-93/7 and more preferably 60/40-90/10 when expressed by the ratio of polyester/radical polymerizable monomer.

When the weight ratio of a polyester (A-a) is from 40 to 95%, superior characteristics of the base polyester as described, such as high processability, superior water resistance and superior adhesion to various substrates, are sufficiently exhibited, eliminating undesirable characteristics of acrylic resin, such as poor processability, poor gloss and poor water resistance. In this range, the carboxyl group content in the radical polymerizable monomer graft branched chain (A-b)' to make it hydrophilic is sufficient to the extent that a good water dispersion can be obtained.

Radical initiator and others

The radical initiator to be used for producing a graft-copolymer (A) is exemplified by known organic peroxides and organic azo compounds. The organic peroxide may be, for example, benzoylperoxide or t-butylperoxy pivalate and the organic azo compound may be, for example, 2,2'-azobisisobutyronitrile or 2,2'-azobis(2,4-dimethylvaleronitrile).

The radical initiator should be selected on the basis of radical forming speed, i.e. half-life of the initiator, at a polymerization temperature. In general, a radical initiator having a half-life value of from 1 minute to 2 hours at said temperature is desirable.

The amount of the radical initiator for graft reaction is 0.2-20% by weight, preferably 0.5-10% by weight based on the radical polymerizable monomer (A-b).

A chain transfer agent such as octyl mercaptan or mercaptoethanol may be added as necessary for adjusting the length of a graft chain, where it is added in a proportion of up to 5% by weight based on the radical polymerizable monomer (A-b).

Polymerization solvent

The solvent to be used for producing a graft-copolymer (A) preferably consists of aqueous organic solvents having a boiling point of from 50° C. to 250° C. The aqueous organic solvent here means those which can be dissolved in water at 20° C. in at least an amount of 10 g/l, preferably 20 g/l or more. Those having a boiling point beyond 250° C. are unsuitable in that they are slow in evaporation and sufficient removal thereof cannot be attained even by high temperature baking of a film. On the other hand, those having a boiling point less than 50° C. are also undesirable for the reason that graft polymerization using such a solvent necessitates use of an initiator capable of cleaving into radicals at a temperature less than 50° C., which in turn means more danger in handling the initiator.

A first group of aqueous solvents which dissolve a polyester (A-a) well and a radical polymerizable monomer (A-b) including a radical polymerizable monomer having a hydrophilic group and a polymer thereof [graft polymer chain (A-b)'] comparatively well include, for example, esters such as ethyl acetate, ketones such as methyl ethyl ketone, methyl isobutyl ketone and eyelohexanone, cyclic ethers such as tetrahydrofuran, dioxane and 1,3-dioxoran, glycol ethers such as ethylene glycol dimethyl ether, propylene glycol methyl ether, propylene glycol propyl ether, ethylene glycol ethyl ether and ethylene glycol butyl ether, carbitols such as methyl carbiltol, ethyl carbitol and butyl carbitol, lower esters of glycols or glycol ethers such as ethylene glycol diacetate and ethylene glycol ethyl ether acetate, ketone alcohols such as diacetone alcohol, and N-substituted amides such as dimethylformamide, dimethylacetamide and N-methylpyrrolidone.

A second group of aqueous solvents which scarcely dissolve a polyester (A-a) but which dissolve a radical polymerizable monomer (A-b) including a radical polymerizable monomer having a hydrophilic group and a polymer thereof [graft polymer chain (A-b)'] comparatively well is exemplified by water, alcohols, carboxylic acids and amines, with preference given to alcohols and polyvalent alcohols having 1 to 8 carbon atoms.

When graft polymerization is carried out in a single solvent, either one of the aqueous organic solvents of the first group may be used. When a mixed solvent is used, two or more from the aqueous organic solvents of the first group or at least one from the first group and at least one from the second group may be used.

Graft-polymerization can be carried out both when the reaction solvent therefor is a single solvent or a mixed solvent from the first group of aqueous organic solvents and when it is a mixed solvent of one from the first group and one from the second group. However, progress behavior of the graft polymerization and appearance and properties of the graft-copolymer (A) and a therefrom-derived aqueous dispersion differ greatly depending on the kind of the solvent used and a mixed solvent of one from the first group and one from the second group is much more desirable.

For example, when tetrahydrofuran belonging to the first group, which shows the strongest dissolution property for a polyester (A-a) and a radical polymerizable monomer (A-b) containing a radical polymerizable monomer having a hydrophilic group and a polymer thereof, is used as a single solvent, graft polymerization proceeds with a transparent appearance of the reaction mixture throughout the reaction. The viscosity of the system gradually rises and becomes too viscous to continue the reaction at the later period of the reaction. In such a case, the reaction product looks like a transparent rubber containing a solvent, which means that a gel undissolved even in a powerful solvent has been produced. For prevention thereof, polymer concentration needs to be so lowered that it is unbeneficial from productional point of view. In contrast, when a polyester is dissolved in a mixed solvent of methyl ethyl ketone from the first group of aqueous organic solvents and isopropyl alcohol from the second group of aqueous organic solvents, which is mixed at a weight ratio of 75/25, the same reaction as in the case of tetrahydrofuran, which was conducted at the same radical polymerizable monomer composition, the same ratio of polyester/radical polymerizable monomer and the same polymer solid content, does not lead to increased viscosity of the system or gelation with the progress of the graft polymerization, and the subsequent treatment for dispersing in water gives a fine aqueous dispersion. Therefrom it follows that the use of the above-mentioned mixed solvent contributes to a higher polymer solid concentration during production and a less amount of an organic solvent to be used for the production, thus making the process a beneficial one.

It has been confirmed by the viscosity measurement of the polyester (A-a) in these solutions that in a solvent of the first group, the molecular chain of polyester (A-a) is in the state of extended chain structure, while in a first group/second group mixed solvent, it is in the state of entangled chain structure. Gelation is effectively prevented by keeping the dissolution of the polyester (A-a) in an entangled chain structure with low molecular effective volume. Highly efficient grafting and prevention of gelation can be attained by using a mixed solvent to be mentioned below.

The weight ratio of first group solvent/second group solvent in a mixed solvent is preferably 95/5–10/90, more preferably 90/10–20/80 and most preferably 85/15–30/70 and the optimal mixing ratio is selected according to the dissolution property of the polyester (A-a) to be used.

Dispersing in water

The graft-copolymer (A) of the present invention is preferably neutralized with a basic compound, whereby to make it easily dispersed in water at an average particle size of not more than 500 nm. The basic compound is preferably those that volatilize during film formation or baking cure with a curing agent to be added, and ammonium and organic amines are suitably used. Examples of the preferable compound include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine and triethanolamine. The basic compound is preferably used in such a manner that the pH value of the aqueous dispersion of the present invention falls within the range of from 5.0 to 9.0, more preferably from 6.0 to 8.5, by at least partially neutralizing or completely neutralizing depending on the carboxyl group content in the graft-copolymer (A).

In dispersing in water, one method will be preparing an aqueous dispersion by previously removing a solvent contained in a graft-copolymer or a graft polymerization product (A) containing same, under reduced pressure in an extruder to make the (A) component a melt or a solid (e.g. pellet, powder) and adding same to water containing a basic compound, followed by stirring under heating. More preferably, however, an aqueous dispersion is prepared by adding water containing a basic compound to a graft-polymerization mixture immediately upon termination of the polymerization, followed by successive stirring under heating (one-pot method). Additionally, when the boiling point of the solvent is not more than 100° C., the solvent used for graft polymerization can be easily removed partly or completely by evaporation.

The solid concentration of the aqueous dispersion of the present invention is 20–60% by weight, which may be diluted with water as necessary.

Dispersion medium for a dispersion

The dispersion medium for the aqueous dispersion of the present invention is water or a mixture of water and a water-soluble organic solvent. Examples of the water-soluble organic solvent include those recited for the exemplification of polymerization solvent, most preferably methyl ethyl ketone and isopropanol which are easily distilled off from the dispersion.

Characteristics of the aqueous dispersion

It is preferable that a polyester (A-a) having a weight average molecular weight of 5,000–50,000 is used as a starting raw material for the aqueous dispersion of the present invention. When the weight average molecular weight is not less than 5,000, polymer properties such as post-processability of a dried film tend to be excellent. A very low weight average molecular weight of the polyester (A-a) makes it easily soluble in water, thus resulting in failure to form a core shell structure to be mentioned later. In addition, a polyester having a weight average molecular weight of 50,000 or less tends to enable easy dispersion in water.

In the aqueous dispersion of the present invention, the weight average molecular weight of a polymer chain (A-b)' of a radical polymerizable monomer (A-b) is preferably 500–50,000. It is generally difficult to control the weight average molecular weight to less than 500 because of the tendency to cause lower graft efficiency and insufficient coupling of a hydrophilic group to a polyester (A-a). The polymer chain (A-b)' of a radical polymerizable monomer forms a hydrated layer of dispersed particles. So as to afford a hydrated layer having a sufficient thickness and a stable dispersion, the weight average molecular weight of a graft-polymer chain (A-b)' of a radical polymerizable monomer is preferably not less than 500. From the aspect of polymerizability in solution polymerization, the upper limit of the weight average molecular weight of a polymer chain (A-b)' of a radical polymerizable monomer is preferably 50,000. Within this range, molecular weight can be controlled by selecting and combining a suitable amount of an initiator, time for dropwise addition of a monomer, polymerization time, a reaction solvent, a monomer composition and a chain transfer agent and a polymerization inhibitor where necessary.

The aqueous dispersion of the present invention has particles with an average particle size, as measured by a laser light scattering method, of not more than 500 nm and has a semi-transparent appearance or is milky white. While various particle sizes can be achieved by adjusting the polymerization condition for the aqueous dispersion of the present invention, a suitable particle size range is from 10 nm to 500 nm. A particle size beyond 500 nm can cause poor surface gloss of a formed film.

The half band width of the signal of the carbonyl group in the ester moiety of the polyester (A-a), as determined by $^{13}C$ NMR, is as great as not less than 300 Hz and that of the signal of the carbonyl group of a polymer chain (A-b)' of a radical polymerizable monomer containing a radical polymerizable monomer having a hydrophilic group neutralized by a basic compound is as small as 150 Hz or less. In NMR, a half band width of the signal of a polymer dissolved in a solvent to be determined is generally small and that of the signal of a polymer insoluble in a solvent to be determined is generally large. Therefrom it is considered that the aqueous dispersion of the present invention has a core shell structure of fine particles where a core portion is an agglomerate of a polyester (A-a) which inherently does not disperse or dissolve in water and a shell portion (which dissolves in water) surrounding the core portion is a polymer chain (A-b)' of a radical polymerizable monomer (A-b) containing a radical polymerizable monomer having a hydrophilic group which is preferably a carboxyl group neutralized by a basic compound. The core shell structure is a two-layer particle structure where a core of a polymer agglomerate unsoluble in a dispersion medium is enveloped by a shell of a polymer soluble and dissolved in a dispersion medium. This structure is peculiar to a dispersion of chemically bonded polymers having different solubilities in a dispersion medium and is not a structure observed in a mere mixture of polymers having different solubilities in a dispersion medium. What is more, a mere mixture of polymers having different solubilities in a dispersion medium cannot exist as an aqueous dispersion of fine particles having a particle size of not more than 500 nm.

In the present invention, such structure of dispersed particles is conducive to the various characteristics of an aqueous dispersion. One of the characteristics is good stability of an aqueous dispersion which does not require addition of an emulsifier or an organic co-solvent which is often used in aqueous dispersions other than that of the present invention, for dispersing high molecular weight copolymerization polyesters in water. This characteristic is attributable to the fact that a shell polymer forms a sufficiently-thick hydrated layer to protect dispersed particles. Also, the aqueous dispersion is superior in re-dispersibility due to the sufficiently-thick shell. The re-dispersibility here means that a film formed from an aqueous dispersion can be dispersed again in water or an original aqueous dispersion medium after losing water or an organic solvent at room temperature, which characteristic being considered very important for the aqueous dispersions to be used for paint or ink. When an aqueous dispersion having no re-dispersibility is used for ink, paint, coating agent etc., a film often becomes defective or an aqueous dispersion may clog on a roller or in a spray gun, because a dried film formed partially during coating work is not re-dispersed in the dispersion. Once treated with heat to dryness, the film loses this core-shell structure and becomes uniform such that the superior processability, adhesion and water resistance possessed by the polyester (A-a) of the core are manifested.

Use of the aqueous dispersion

The aqueous dispersion of the present invention can be used as a vehicle for paints, ink, coating agents, adhesives and so on or as a treating agent for fibers, films and paper products. While the aqueous dispersion of the present invention can be used as it is, a high level of water resistance can be achieved by baking-cure with a crosslinking agent (curing polymer). The crosslinking agent includes, for example, phenol-formaldehyde polymer, amino polymer, multi-functional epoxy compounds, multi-functional isocyanate compounds and various blocked isocyanate compounds thereof, multi-functional aziridine compounds and so on.

The phenolic polymer is exemplified by phenols, alkylated phenols and cresols. Specifically included are formaldehyde condensates of alkylated (methyl, ethyl, propyl, isopropyl, butyl)phenol, p-tert-amylphenol, 4,4'-sec-butylidenephenol, p-tert-butylphenol, o-, m- or p-cresol, p-cyclohexylphenol, 4,4'-isopropylidenephenol, p-nonylphenol, p-octylphenol, 3-pentadecylphenol, phenol, phenyl-o-cresol, p-phenylphenol, xylenol and the like.

Examples of the amino polymer include addition products of urea, melamine, benzoguanamine etc. with formaldehyde and alkyl ether compounds thereof with an alcohol having 1 to 6 carbon atoms. Specifically included are methoxylated methylol urea, methoxylated methylol N,N-ethylene urea, methoxylated methyloldicyandiamide, methoxylated methylolmelamine, methoxylated methylolbenzoguanamine, butoxylated methylolmelamine, buthoxylated methylolbenzoguanamine and so on, with preference given to methoxylated methylolmelamine, butoxylated methylolmelamine and methoxylated methylolbenzoguanamine, which are used alone or in combination.

Examples of the epoxy compounds include diglycidyl ether of bisphenol A and its oligomer, diglycidyl ether of hydrogenated bisphenol A and its oligomer, diglycidyl orthophthalate, diglycidyl isophthalate, diglycidyl terephthalate, diglycidyl p-oxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether and polyalkylene glycol diglycidyl ethers, triglycidyl trimellitate, triglycidyl isocyanulate, 1,4-diglycidyl oxybenzene, diglycidyl propylene urea, glycerol triglycidyl ether, trimethylolpropane triglycidyl ether, pentaerythrithol triglycidyl ether and triglycidyl ether of glycerol alkyleneoxide.

Examples of the isocyanate compound include aromatic or aliphatic diisocyanates and polyisocyanates having three or more functional groups, which may be low molecular compounds or high molecular compounds. Specifically, tetramethylenediisocyanate, hexamethylenediisocyanate, toluenediisocyanate, diphenylmethanediisocyanate, hydrogenated diphenylmethanediisocyanate, xylylenediisocyanate, hydrogenated xylylenediisocyanate, isophoronediisocyanate, trimers of these isocyanate compounds and compounds having terminal isocyanate group obtained by reacting an excessive amount of the above-mentioned isocyanate compound with a low molecular compound having active hydrogen, such as ethylene glycol, propylene glycol, trimethylol propane, glycerine, sorbitol, ethylenediamine, monoethanolamine, diethanolamine or triethanolamine or a high molecular compound having active hydrogen, of various polyester-polyols, polyether-polyols or polyamides.

The isocyanate compoud may be, for example, blocked isocyanate. The isocyanate blocking agent includes, for example, phenols such as phenol, thiophenol, methylthiophenol, cresol, xylenol, resorcinol, nitrophenol and chlorophenol, oxims such as acetoxime, methyl ethyl ketoxime and cyclohexanonoxime, alcohols such as methanol, ethanol, propanol and butanol, halogenated alcohols such as ethylenechlorohydrine and 1,3-dichloro-2-propanol, tertiary alcohols such as t-butanol and t-pentanol, lactams such as ε-caprolactam, δ-valerolactam, γ-butyrolactam and β-propyllactam. Besides these, aromatic amines, imides, activated methylene compounds such as acetylacetone, acetoacetate, ethyl maronate etc. mercaptanes, imines, ureas and sodium bisulfite of diaryl compounds are mentioned. The blocked isocyanate can be obtained by an addition reaction of the above-mentioned isocyanate compounds and the isocyanate blocking agent by a suitable method known per se.

A crosslinking agent may be added by (1) dissolving or dispersing an aqueous crosslinking agent directly in an aqueous disersion or (2) adding an oily crosslinking agent before or after dispersing in an aqueous medium subsequent to a graft reaction so that the agent co-exists in a core with polyester. The crosslinking agent may be optionally selected according to the kind and properties thereof. A crosslinking agent or an accelerator may be used alongside.

The curing reaction is generally carried out by heating at 60°–250° C. for about 1–60 minutes according to the kind of the crosslinking agent to be added in a proportion of 5–40 parts (solid) per 100 parts (solid) of the aqueous dispersion of the present invention. Where necessary, a catalyst or an accelerator may be used. The aqueous dispersion of the present invention may contain pigments, dyes, various additives as necessary. The aqueous dispersion of the present invention may be mixed with other aqueous polymer and aqueous dispersion to improve the processability thereof.

Paints, ink, coating agents, adhesives and various treating agents comprising the aqueous dispersion of the present invention are superior in re-dispersibility and can be suitably applied to dip coating method, brush painting method, roll coating method, spray method and various printing methods.

The present invention is explained in more detail in the following examples, to which the present invention is not limited.

In the following examples, "part" means "part by weight" and "%" means "% by weight", unless otherwise specified. The following items were determined as follows.

(1) Height average molecular weight

A polymer (0.03 g) was dissolved in tetrahydrofuran (10 ml) and weight average molecular weight was measured with GPC-LALLS low angle light scattering photometer LS-8000 (manufactured by Toso, tetrahydrofuran solvent, reference: polystyrene).

(2) Polyester graft efficiency

A product (A) obtained by graft-polymerization was measured for 220 MHz $^1$H NMR and 55 MHz $^{13}$C NMR (measurement apparatus manufactured by Varian, determination solvent $CDCl_3$/DSO-$d_6$) and graft efficiency was determined based on a change in strength of a signal derived from a double bond in a polyester chain (A-a), which is copolymerized with polymerizable monomers (A-b).

Polyester graft efficiency (%)={1-(relative strength of signal derived from the double bond in a polyester chain (A-a) in graft-polymerization product/relative strength of signal derived from the double bond in a polyester chain (A-a) in raw material polyester)}×100

A relative strength was calculated from a comparison with an internal signal strength as a standard.

(3) Weight average molecular weight of graft chain (A-b)'

A product (A) obtained by graft-polymerization was hydrolyzed in a KOH/water-methanol solution under reflux. The hydrolysis product was extracted with THF under the acidic conditions and a radical polymerizable polymer was purified with hexane by reprecipitation. The polymer was measured with GPC apparatus (manufactured by Shimazu Seisakusho, Japan, tetrahydrofuran solvent, reference: polystyrene) and weight average molecular weight of graft chains (A-b)' was calculated.

(4) Size of particles in aqueous dispersion

Using only an ion-exchanged water, the solid concentration of an aqueous dispersion was adjusted to 0.1% and the particle size was measured with a laser light scattering particle size distributor Coulter model N4 (manufactured by Coulter) at 20° C.

(5) B-type viscosity of aqueous dispersion

The viscosity of an aqueous dispersion was measured with Brookfield rotation viscometer (E type, manufactured by Tokyo Keiki, Japan) at 25° C.

(6) Re-dispersibility of aqueous dispersion

An aqueous dispersion was coated on a glass sheet in such a manner that the dried film thickness was 15 μm and dried at room temperature for 1 hour. The coated sheet was soaked in distilled water and compared with that before soaking. The results are evaluated as follows.

Rank
1: No change in film appearance before and after soaking.
2: Film surface whitened.
3: Film peeled off but did not re-disperse in distilled water.
4: Film peeled off and re-dispersed in distilled water, leaving a small amount of unsoluble portion.
5: Film peeled off and completely re-dispersed in distilled water.

(7) Half band width of $^{13}$C NMR

An aqueous dispersion was diluted with heavy water to a concentration of 20% and DSS (sodium 2,2-dimethyl-2-silapentane-5-sulfonate) was added thereto to prepare a sample. The sample was subjected to 125 MHz $^{13}$C pulse Fourier transform NR (manufactured by Varian) measurement at 25° C., based on which the half band width of a signal of a carbon of a carbonyl group of a polyester (A-a) and that of a signal of a carbon of a carbonyl group of a polymer chain (A-b)' of a radical polymerizable monomer of a graft-copolymer (A) were determined. The measuring conditions were set to get the half-band width of DSS below 5 Hz.

(8) Hardness of cured film (pencil hardness)

By applying a high grade pencil as defined in JIS S-6006 to a cured film prepared from an aqueous dispersion (thickness: 50 μm) on a steel sheet, hardness was measured according to JIS K-5400.

(9) Gloss of cured film

Determined by reflectance at 60°. The thickness of the cured film was 50 μm. It was measured with a glossmeter (Type VG 107, manufactured by Nippon Denshoku Kogyo KK, Japan).

(10) Flex resistance of cured film

A steel sheet coated with a film of an aqueous dispersion (cured film thickness: 50 μm) was bent by 180° and the crack which occurred at the bent site was checked with a 10×magnifier and evaluated, wherein 4T means no occurrence of a crack when 4 sheets of the same thickness were inserted at the bent.

(11) Adhesion of cured film

Determined according to ASTM D-3359.

(12) Sovent resistance of cured film

A cured film of an aqueous dispersion (thickness: 50 μm) was rubbed with a gauze impregnated with xylene and the number of times of rubbing necessary for exposing the underlying substrate was recorded.

(13) Water resistance of cured film

Melamine (Sumimal M30N, manufacture by Sumitomo Kagaku Kogyo, Japan), 25 parts (solid), p-toluenesulfonic acid [catalyst, 0.25 part (solid)], titanium oxide (100 parts) and glass beads (250 parts) were added to 100 parts (solid) of an aqueous dispersion and the mixture was shake-dispersed in a paint shaker for 5 hours. Then, the dispersion was coated on a galvanized steel sheet in such a manner that the dried film thickness was 15 μm and baked at 230° C. for 1 minute. The obtained coated sheet was boiled in water for 2 hours and presence of blister and gloss retention (%) were evaluated. The gloss retention was calculated by the following equation.

Gloss retention (%)=(gloss after treatment/initial gloss) ×100

(14) Smoothness of cured film

The smoothness was evaluated by observing the change of appearance of the cured film.

Reference Example 1

Production of polyester (A-1)

Dimethyl terephthalate (466 parts), dimethyl isophthalate (466 parts), neopentyl glycol (401 parts), ethylene glycol (443 parts) and t-n-butyl titanate (0.52 part) were charged in a stainless steel autoclave equipped with a stirrer, a thermometer and partially refluxing condenser and ester interchange was carried out at between 160 °C. and 220° C. for 4 hours. Thereto was added fumaric acid (23 parts) and the temperature was elevated from 200° C. to 220° C. over 1 hour for esterification. The mixture was elevated to 255° C. and the reaction system was gradually depressurized and reacted under 0.2 mmHg for 1.5 hours. Trimellitic anhydride (19 parts) was added thereto and the mixture was stirred under nitrogen at 220° C. for 1 hour to give a polyester (A-1). The polyester (A-1) obtained was a pale yellow transparent product having a weight average molecular weight of 12,000. The composition as determined by NMR etc. was as follows.

| Dicarboxylic acid component | |
|---|---|
| Terephthalic acid | 47% by mole |
| Isophthalic acid | 47% by mole |
| Fumaric acid | 4% by mole |
| Trimellitic acid | 2% by mole |
| Diol component | |
| Neopentyl glycol | 50% by mole |

-continued

| | |
|---|---|
| Ethylene glycol | 50% by mole |

By the similar procedure, various polyesters (A-2–A-10) as shown in Table 1 were prepared. Each polyester was determined for reduced viscosity and composition analysis as determined by NMR etc, the results of which are shown in Table 1. In the Table, each component represents % by mole.

TABLE 1

| Raw material | A-1 | A-2 | A-3 | A-4 | A-5 | A-6 | A-7 | A-8 | A-9 | A-10 |
|---|---|---|---|---|---|---|---|---|---|---|
| T | 48 | 29 | 49 | 47 | 47 | 46 | 46 | 49 | 34 | 50 |
| I | 47 | 29 | 48 | 47 | 46 | 46 | 46 | 49 | 34 | 50 |
| SA | 0 | 36 | 0 | 0 | 0 | 0 | 0 | 0 | 0 | 0 |
| ND | 0 | 0 | 0 | 0 | 0 | 6 | 0 | 0 | 0 | 0 |
| MANH | 0 | 0 | 0 | 0 | 0 | 0 | 6 | 0 | 0 | 0 |
| F | 4 | 4 | 3 | 4 | 5 | 0 | 0 | 0 | 30 | 0 |
| TMA | 2 | 2 | 0 | 0 | 2 | 2 | 2 | 2 | 2 | 0 |
| TMEG | 0 | 0 | 0 | 2 | 0 | 0 | 0 | 0 | 0 | 0 |
| NPG | 50 | 50 | 50 | 50 | 0 | 50 | 50 | 50 | 50 | 50 |
| EG | 50 | 50 | 50 | 50 | 50 | 50 | 50 | 50 | 50 | 50 |
| BPE | 0 | 0 | 0 | 0 | 50 | 0 | 0 | 0 | 0 | 0 |
| Weight av. mol. wt. ($\times 10^4$) | 1.2 | 1.4 | 2.5 | 4.2 | 1.5 | 1.4 | 1.7 | 1.3 | 1.2 | 2.5 |

Note T: terephthalic acid I: isophthalic acid SA: sebacic acid ND: 2,5-norbornenedicarboxylic acid MANH: maleic anhydride F: fumaric acid TMA: trimellitic acid TMEG: ethylene glycol bis(anhydrotrimellitate) NPG: neopentyl glycol EG: ethylene glycol BPE: 2,2-bis(4-hydroxyethoxyphenyl)propane

EXAMPLE 1

A polyester (A-1) (75 parts), methyl ethyl ketone (56 parts) and isopropyl alcohol (19 parts) were charged in a reaction vessel equipped with a stirrer, a thermometer, a refluxing device and a dripping device and the mixture was stirred at 65° C. for dissolution of the polyester. Upon complete dissolution of the polyester, a mixture of methacrylic acid (17.5 parts) and ethyl acrylate (7.5 parts) and azobisdimethyl valeronitrile (1.2 parts) in 25 parts of methyl ethyl ketone were dropwise added to the polyester solution at 0.2 ml/min, followed by stirring for 2 hours. A sample (5 g) for analysis was taken from the reaction mixture and water (300 parts) and triethylamine (25 parts) were added to the reaction mixture, followed by stirring for 1 hour. The temperature of the dispersion was raised to 100° C. and the methyl ethyl ketone, the isopropyl alcohol and the excess triethylamine were distilled away by evaporation. The resultant aqueous dispersion (B-1) was white and had particles with an average particle diameter of 300 nm and B-type viscosity at 25° C. of 50 cps.

Heavy water (1.25 g) was added to the aqueous dispersion (5 g) to a solid concentration of 20%, DSS was added thereto and 125 MHz $^{13}$C NMR of the aqueous dispersion was measured. The half band width of a signal (160–175 ppm) of a carbon of a carbonyl group of the polyester (A-a) was ∞ (no signal was detected) and that of a signal (181–186 ppm) of a carbon of a carbonyl group of the methacrylic acid was 110 MHz. The obtained aqueous dispersion was left standing at 40° C. for 60 days. No change in appearance nor a change in viscosity was observed, thus exhibiting very superior storage stability. The obtained aqueous dispersion was coated on a glass sheet in such a manner that the dried film thickness was 15 μm and air-dried at room temperature for 1 hour. The coated sheet was soaked in distilled water. Upon soaking, the film dispersed in water, showing superior re-dispersibility of rank 4–5.

The solution sampled upon termination of the graft polymerization was dried in vacuo at 100° C. for 8 hours and subjected to measurements of acid value of a solid component therein, polyester graft efficiency (determination of NMR) and molecular weight of graft side chain by hydrolysis. The acid value of a solid component was 2300 eq./$10^6$ g. In view of void detection of a signal derived from fumaric acid in the determination of $^1$H NMR ($\delta = 6.8$–$6.9$ ppm, doublet), polyester graft efficiency was considered to be 100%. The polyester (A-a) in the solid component was hydrolyzed and a molecular weight of a polymer chain (A-b)' was determined by GPC to obtain the value of 10,000.

EXAMPLES 2–7

In a similar manner as in Example 1, various aqueous dispersions (B-2–B-7) were prepared. The properties of each aqueous dispersion are shown in Table 2.

Comparative Examples 1–3

In a similar manner as in Example 1, various aqueous dispersions (B-8–B-10) were prepared. The properties of each aqueous dispersion are shown in Table 2.

EXAMPLES 8–11

In a similar manner as in Example 1, various aqueous dispersions (B-11–B-14) were prepared according to the composition ratio shown in Table 3. The properties of each aqueous dispersion are shown in Table 4.

Comparative Examples 4–7

In a similar manner as in Example 1, various aqueous dispersions (B-15–B-18) were prepared according to the composition ratio shown in Table 3. The properties of each aqueous dispersion are shown in Table 4.

EXAMPLE 12

A polyester (A-1) (75 parts), methyl ethyl ketone (56 parts) and isopropyl alcohol (19 parts) were charged in a reaction vessel equipped with a stirrer, a thermometer, a refluxing device and a dripping device and the mixture was stirred at 65° C. for dissolution of the polyester. Upon complete dissolution of the polyester, maleic anhydride (13.0 parts) was added to the polyester solution. Then, styrene (12.0 parts) and azobisdimethyl valeronitrile (1.5 parts) in 12 parts of methyl ethyl ketone were dropwise added to the polyester solution at 0.1 ml/min, followed by stirring for 2 hours. A sample (5 g) for analysis was taken from the reaction mixture and methanol (5 parts) was added to convert anhydride moiety to half-ester, after which water (300 parts) and triethylamine (15 parts) were added to the reaction mixture, followed by stirring for 1 hour. The temperature of the dispersion was raised to 100° C. and the methyl ethyl ketone, the isopropyl alcohol and the excess triethylamine were distilled away by evaporation. The resultant aqueous dispersion (B-19) was white and had particles with an average particle diameter of 200 nm and B-type viscosity at 25° C. of 100 cps.

The obtained aqueous dispersion was left standing at 40° C. for 90 days. No change in appearance nor a change in viscosity was observed, thus exhibiting very superior storage stability. The obtained aqueous dispersion was coated on a glass sheet in such a manner that the dried film thickness was 15 μm and air-dried at room temperature for 1 hour. The coated sheet was soaked in distilled water. Upon soaking, the film dispersed in water, showing superior re-dispersibility of rank 4.

In the same manner as in Example 1, 125 MHz $^{13}$C NMR of the obtained aqueous dispersion was measured. The half band width of a signal (160–175 ppm) of a carbon of a carbonyl group of the polyester (A-a) was ∞ (no signal was detected) and that of a signal (181–186 ppm) of a carbon of a carbonyl group of the maleic acid chain was 110 Hz.

The solution sampled upon termination of the graft polymerization was dried in vacuo at 100° C. for 8 hours and subjected to measurements of acid value of a solid component therein, polyester graft efficiency (determination of NMR) and molecular weight of graft side chain by hydrolysis. The acid value of a solid component was 1300 eq./$10^6$ g. In view of void detection of a signal derived from fumaric acid in the determination of $^1$H NMR (δ=6.8–6.9 ppm, doublet), polyester graft efficiency was considered to be 100%. The graft copolymer in the solid component was hydrolyzed and a molecular weight of a radical polymerizable monomer was determined by GPC to obtain the value of 10,000.

TABLE 2

|  | Examples | | | | | | | Comp. Ex. | | |
| --- | --- | --- | --- | --- | --- | --- | --- | --- | --- | --- |
|  | 1 | 2 | 3 | 4 | 5 | 6 | 7 | 1 | 2 | 3 |
| Dispersion | B-1 | B-2 | B-3 | B-4 | B-5 | B-6 | B-7 | B-8 | B-9 | B-10 |
| Polyester |  |  |  |  |  |  |  |  |  |  |
| (A-a) | A-1 | A-2 | A-3 | A-4 | A-5 | A-6 | A-7 | A-8 | A-9 | A-10 |
| [Mw of radical polymer chain (A-b)′] ($\times 10^4$) | 1.0 | 0.9 | 1.1 | 1.0 | 0.8 | 0.9 | 1.0 | 1.5 | 0.6 | 1.3 |
| Acid value (eq/$10^6$ g) | 2300 | 2200 | 1900 | 2000 | 2100 | 2200 | 2100 | 2000 | 2100 | 1800 |
| Appearance | white | white | white | white | white | white | white | two layer separation | white | two layer separation |
| Particle diameter (nm) | 300 | 250 | 450 | 400 | 200 | 400 | 350 | — | >10000 | — |
| Viscosity (cps) | 50 | 70 | 30 | 40 | 90 | 80 | 60 | — | 50 | — |
| [$^{13}$C NMR half band width] |  |  |  |  |  |  |  |  |  |  |
| Pes C = O | ∞ | 570 | ∞ | ∞ | 630 | ∞ | ∞ | — | ∞ | — |
| Acryl C = O | 110 | 120 | 110 | 100 | 195 | 110 | 120 | — | 100 | — |
| [Storage stability 40° C., 60 days] |  |  |  |  |  |  |  |  |  |  |
| Change in appearance | none | none | none | none | none | none | none | — | separation | — |
| Re-dispersibility rank | 4–5 | 4–5 | 3–4 | 4 | 4–5 | 3–4 | 3–4 | — | 3–4 | — |

TABLE 3

|  | Examples | | | | Comparative Examples | | | |
| --- | --- | --- | --- | --- | --- | --- | --- | --- |
|  | 8 | 9 | 10 | 11 | 4 | 5 | 6 | 7 |
| Dispersion | B-11 | B-12 | B-13 | B-14 | B-15 | B-16 | B-17 | B-18 |
| Raw material Pes*$^1$ | A-1 | A-1 | A-1 | A-1 | A-1 | A-1 | A-1 | A-1 |
| [Radical copolymerizable monomer*$^2$] |  |  |  |  |  |  |  |  |
| MAA (parts) | 0 | 0 | 9.8 | 9.8 | 9.8 | 0 | 9.8 | 0 |
| AA (parts) | 6.8 | 9.8 | 0 | 0 | 0 | 0 | 0 | 0 |
| EA (parts) | 5.2 | 5.2 | 5.2 | 5.2 | 5.2 | 0 | 5.2 | 15 |
| HEA (parts) | 3.0 | 0 | 0 | 0 | 0 | 0 | 0 | 0 |
| [Reaction solvent*$^3$] |  |  |  |  |  |  |  |  |
| MEK (parts) | 64 | 64 | 64 | 0 | 0 | 64 | 64 | 64 |
| IPA (parts) | 21 | 21 | 21 | 0 | 0 | 21 | 21 | 21 |
| THF (parts) | 0 | 0 | 0 | 85 | 0 | 0 | 0 | 0 |
| Tol (parts) | 0 | 0 | 0 | 0 | 85 | 0 | 0 | 0 |
| [ion exchange water] |  |  |  |  |  |  |  |  |
| Amount (parts) | 300 | 300 | 300 | 300 | 300 | 300 | 300 | 300 |
| [Neutralizer*$^4$] |  |  |  |  |  |  |  |  |
| TEA (parts) | 25 | 25 | 0 | 25 | 25 | 25 | 0 | 25 |

TABLE 3-continued

|  | Examples ||||  Comparative Examples ||||
| --- | --- | --- | --- | --- | --- | --- | --- | --- |
|  | 8 | 9 | 10 | 11 | 4 | 5 | 6 | 7 |
| DMAE (parts) | 0 | 0 | 25 | 0 | 0 | 0 | 0 | 0 |

Note: *¹polyester 85 parts *²MAA: methacrylic acid AA: acrylic acid EA: ethyl acrylate *³THF: tetrahydrofuran MEK: methyl ethyl ketone Tol: toluene IPA: isopropyl alcohol *⁴TEA: triethylamine DMAE: dimethylaminoethanol

TABLE 4

|  | Examples |||| Comp. Ex. ||||
| --- | --- | --- | --- | --- | --- | --- | --- | --- |
|  | 8 | 9 | 10 | 11 | 4 | 5 | 6 | 7 |
| Dispersion Appearance | B-11 white | B-12 semi-transparent | B-13 white | B-14 white | B-15 two layer separation | B-16 two layer separation | B-17 two layer separation | B-18 two layer separation |
| Particle diameter (nm) | 200 | 80 | 250 | 400 | — | — | — | — |
| Viscosity (cps) | 50 | 200 | 50 | 30 | — | — | — | — |
| [¹³C NMR half band width] |  |  |  |  |  |  |  |  |
| Pes C = 0 | ∞ | 550 | ∞ | ∞ | — | — | — | — |
| Acryl C = 0 | 200 | 100 | 110 | 250 | — | — | — | — |
| [Storage stability 40° C., 60 days] |  |  |  |  |  |  |  |  |
| Change in appearance | none | none | none | none | — | — | — | — |
| [Storage stability 40° C., 90 days] |  |  |  |  |  |  |  |  |
| Change in appearance | none | none | none | observed* | — | — | — | — |

Note: *Undispersed substance observed in small amount.

EXAMPLES 13-14

Melemine resin (Sumimal M30W), 25 parts (solid), p-toluenesulfonic acid (catalyst, 0.25 parts, solid), titanium oxide (100 parts) and glass beads (250 parts) were added to 100 solid parts each of the aqueous dispersions (B-1) and (B-2) and the mixtures were dispersed by shaking in a paint shaker for 5 hours. Then, each of the dispersions was coated on a galvanized steel sheet in such a manner that the dried film thickness was 15 μm and baked at 230° C. for 1 minute to form a cured film. The properties of the obtained cured films are shown in Table 5.

Comparative Example 8

In the same manner as in Example 13 except that an aqueous dispersion (B-9) was used in place of (B-1), a paint and a film were obtained. The properties of the obtained cured film is shown in Table 5.

Comparative Example 9

Dimethyl terephthalate (466 parts), dimethyl isophthalate (466 parts), neopentyl glycol (401 parts), ethylene glycol (443 parts) and tetra-n-butyl titanate (0.52 part) were charged in a stainless steel autoclave equipped with a stirrer, a thermometer and a partially refluxing condenser and ester exchange was carried out at between 160° C. and 220° C. for 4 hours. Thereto was added fumaric acid (23 parts) and the temperature was elevated from 200° C. to 220° C. over 1 hour for esterification. The temperature was elevated to 255° C. and the reaction system was gradually depressurized and reacted at 0.2 mmHg for 15 minutes. Trimellitic anhydride (19 parts) was added thereto and the mixture was stirred under nitrogen at 220 for 1 hour to give a polyester (A-11). The polyester (A-11) obtained was a pale yellow transparent product having a weight average molecular weight of 4,000. The composition as determined by NMR etc. was as follows.

| Dicarboxylic acid component |  |
| --- | --- |
| Terephthalic acid | 47% by mole |
| Isophthalic acid | 47% by mole |
| Fumaric acid | 4% by mole |
| Trimellitic acid | 2% by mole |
| Diol component |  |
| Neopentyl glycol | 50% by mole |
| Ethylene glycol | 50% by mole |

The polyester (A-11) was graft polymerized and dispersed in water in the same manner as in Example 1. The obtained aqueous dispersion (B-20) was a white product having particles with an average particle diameter of 80 nm and B-type viscosity at 25° C. of 200 cps. From this dispersion, a paint and a film were obtained in the same manner as in Example 13. The properties of the obtained cured films are shown in Table 5.

Comparative Example 10

Dimethyl terephthalate (466 parts), dimethyl isophthalate (466 parts), neopentyl glycol (401 parts), ethylene glycol (443 parts) and tetra-n-butyl titanate (0.52 part) were charged in a stainless steel autoclave equipped with a stirrer, a thermometer and a partially refluxing condenser and ester exchange was carried out at between 160° C. and 220° C. for 4 hours. Thereto was added sodium 5-sulfoisophthalate (67 parts) and the temperature was elevated from 200° C. to 220° C. over 1 hour for esterification. The temperature was elevated to 255° C. and the reaction system was gradually depressurized and reacted at 0.2 mmHg for 1.5 hours to give a polyester (A-12). The polyester (A-12) obtained was a pale yellow transparent product having a weight average molecular weight of 25,000. The composition as determined by NMR etc. was as follows.

| Dicarboxylic acid component |
| --- |

| | -continued | |
|---|---|---|
| Terephthalic acid | | 48% by mole |
| Isophthalic acid | | 48% by mole |
| Sodium 5-sulfoisophthalate | | 4% by mole |
| Diol component | | |
| Neopentyl glycol | | 50% by mole |
| Ethylene glycol | | 50% by mole |

The polyester (A-12) (34 parts) and ethylene glycol-n-butyl ether (10.8 parts) were charged in a container and stirred at 150°–170° C. for about 2 hours to give a uniform, viscous molten solution. Water (55.2 parts) was gradually added while vigorously stirring the mixture and about 1 hour later, a uniform, pale blue-while aqueous dispersion (B-21) was obtained. The obtained aqueous dispersion was coated on a glass sheet in such a manner that the dried film thickness was 15 μm and air-dried at room temperature for 1 hour. The coated sheet was soaked in distilled water. No change in appearance was observed, showing-no re-dispersibility. From this dispersion, a paint and a film were obtained in the same manner as in Example 13. The properties of the obtained cured film is shown in Table 6.

Comparative Example 11

Adipic acid (388 parts), isophthalic acid (339 parts), maleic anhydride (85 parts), benzoic acid (112 parts), dimethyl propionate (90 parts), neopentyl glycol (692 parts), water (77 parts) and dibutyltin oxide (1.5 parts) were charged in a stainless steel reactor equipped with a stirrer, a thermometer and a partially refluxing condenser and ester exchange was carried out by allowing reaction at 149° C. for 1.5 hours and at between 193° C. and 210° C. for 4 hours to give a polyester (A-13). The polyester (A-13) obtained was a pale yellow transparent product having a weight average molecular weight of 1,000.

The polyester (A-13) was graft polymerized and dispersed in water in the same manner as in Example 1. The obtained aqueous dispersion (B-22) was a white product having particles with an average particle diameter of 300 nm and B-type viscosity at 25° C. of 100 cps or more (unmeasurable due to high viscosity). Heavy water (1.25 g) was added to the aqueous dispersion (5 g) to a solid concentration of 20%, DSS was added thereto and 125 MHz $^{13}$C NMR of the aqueous dispersion was measured. The half band width of a signal of a carbon of a carbonyl group of the polyester (A-a) was 150 Hz and that of a signal of a carbon of a carbonyl group of the methacrylic acid chain was 200 Hz. From this dispersion, a paint and a film were obtained in the same manner as in Example 13. The properties of the obtained cured film is shown in Table 6.

TABLE 5

| | Examples | | Comp. Ex. | |
|---|---|---|---|---|
| | 13 | 14 | 8 | 9 |
| Dispersion used | B-1 | B-2 | B-9 | B-20 |
| [Properties of coated film] | | | | |
| Smoothness | fine | fine | poor | fine |
| Gloss | 82 | 83 | 40 | 90 |
| Flex resistance (4T) | fine | fine | poor | poor |
| Pencil hardness | H | H | F | H |
| Adhesion | 100/100 | 100/100 | 30/100 | 100/100 |
| Solvent resistance (times) | >50 | >50 | <30 | >50 |

TABLE 5-continued

| | Examples | | Comp. Ex. | |
|---|---|---|---|---|
| | 13 | 14 | 8 | 9 |
| Water resistance | 91 | 93 | 60 | 90 |
| Gloss retention (%) | | | | |
| Blister | nil | nil | observed | nil |

TABLE 6

| | Examples | | Comp. Ex. | |
|---|---|---|---|---|
| | 13 | 14 | 10 | 11 |
| Dispersion used | B-1 | B-2 | B-21 | B-22 |
| [Re-dispersibility] rank | 4–5 | 4–5 | 1 | 4–5 |
| [$^{13}$C NMR half band width] | | | | |
| Pes C = 0 | ∞ | 570 | 660 | 150 |
| Acryl C = 0 | 100 | 120 | — | 200 |
| [Properties of coated film] | | | | |
| Flex resistance (4T) | fine | fine | fine | poor |
| Water resistance | | | | |
| Gloss retention (%) | 91 | 93 | 46 | 55 |

EXAMPLE 15

A polyester (A-1) (75 parts), methyl ethyl ketone (56 parts) and isopropyl alcohol (19 parts) were charged in a reaction vessel equipped with a stirrer, a thermometer, a refluxing device and a dripping device and the mixture was stirred at 65° C. for dissolution of the polyester. Upon complete dissolution of the polyester, a mixture of chloromethyl styrene (15 parts) and ethyl acrylate (10 parts) and a solution of azobisisobutylonitrile (1.5 parts) and mercaptoethanol (2.5 parts) in 25 parts of methyl ethyl ketone were dropwise added to the polyester solution at 0.2 ml/min, followed by stirring for 2 hours. A sample (5 g) for analysis was taken from the reaction mixture and triethylamine (19.2 parts) was added thereto, after which water (200 parts) adjusted to pH 3 with acetic acid was added to the reaction mixture, followed by stirring for 1 hour. The temperature of the dispersion was raised to 100° C. and the methyl ethyl ketone, the isopropyl alcohol and the excess triethylamine were distilled away by evaporation. The resultant aqueous dispersion (B-23) was white and had particles with an average particle diameter of 300 nm and B-type viscosity at 25° C. of 40 cps.

Heavy water (1.25 g) was added to the aqueous dispersion (5 g) to a solid concentration of 20%, DSS was added thereto and 125 MHz $^{13}$C NMR of the aqueous dispersion was measured. The half band width of a signal (160–175 ppm) of a carbon of a carbonyl group of the polyester (A-a) was ∞ (no signal was detected).

The obtained aqueous dispersion was left standing at 40° C. for 60 days. No change in appearance nor a change in viscosity was observed, thus exhibiting very superior storage stability. The obtained aqueous dispersion was coated on a glass sheet in such a manner that the dried film thickness was 15 μm and air-dried at room temperature for 1 hour. The coated sheet was soaked in distilled water. Upon soaking, the film dispersed in water, showing superior re-dispersibility of rank 4–5.

The solution sampled upon termination of the graft polymerization was dried in vacuo at 100° C. for 8 hours and subjected to measurements of acid value of a dried component therein, polyester graft efficiency (determination of NMR) and molecular weight of graft side chain by hydrolysis. In view of void detection of a signal derived from fumaric acid in the determination of $^1$H NMR ($\delta$=6.8–6.9 ppm, doublet), polyester graft efficiency was considered to be 100%. The graft copolymer in the solid component was hydrolyzed and a molecular weight of a radical polymer chain was determined by GPC to obtain the value of 9,000. The hydrophilic group in the radical polymerizable monomer in this dispersion was quaternary ammonium salt.

The aqueous polyester dispersion of the present invention is superior in re-dispersibility and when a paint prepared from the dispersion is coated on a metal or a plastic, the coated film shows superior appearance, processability and water resistance. Accordingly, the aqueous dispersion of the present invention serves well for use for paints, ink, coating agents, adhesives and various treating agents.

What is claimed is:

1. An aqueous dispersion comprising a graft-copolymer (A) dispersed in water or a mixed solvent (B) of water and a water-soluble organic solvent, the graft-copolymer (A) comprising a polyester (A-a) graft-polymerized with a radical copolymerizable monomer (A-b) comprising a radical copolymerizable monomer having a hydrophilic group, wherein said graft-copolymer (A) is dispersed as fine particles having an average particle size of not more than 500 nm and a half band width of a signal of a carbon of a carbonyl group of the polyester, as determined by $^{13}$C-NMR, is not less than 300 Hz.

2. The aqueous dispersion of claim 1, wherein the polyester (A-a) is obtained by copolymerizing a dicarboxylic acid having a polymerizable unsaturated double bond in a proportion of 0.5–10% by mole relative to the moles of dicarboxylic acid in the polyester (A-a).

3. The aqueous dispersion of claim 2, wherein the dicarboxylic acid is at least one member selected from the group consisting of fumaric acid, maleic acid and 2,5-norbornenedicarboxylic acid.

4. The aqueous dispersion of claim 1, wherein the polyester (A-a) is not soluble in water, nor dispersible in water in the absence of a dispersant therefor in the water.

5. The aqueous dispersion of claim 1, wherein the hydrophilic group is a carboxylic group.

6. The aqueous dispersion of claim 1, wherein the graft-copolymer (A) comprises a plurality of the radical copolymerizable monomers (A-b), the plurality of monomers (A-b) defining a polymer chain (A-b)', and wherein, in the graft-copolymer (A), the weight ratio of the polyester (A-a) to the polymer chain (A-b)' is 40:60–95:5.

7. The aqueous dispersion of claim 1, wherein the graft-copolymer (A) comprises a plurality of the radical copolymerizable monomers (A-b), the plurality of monomers (A-b) defining a polymer chain (A-b)', and wherein the weight average molecular weight of the polymer chain (A-b)' in the graft-copolymer (A) is 500–50,000.

8. The aqueous dispersion of claim 5, wherein a total acid value of the graft-copolymer (A) which has not undergone neutralization is 600–4000 eq/$10^6$ g.

9. The aqueous dispersion of claim 8, wherein the graft-copolymer (A) comprises a plurality of the radical copolymerizable monomers (A-b), the plurality of monomers (A-b) defining a polymer chain (A-b)', and wherein the polymer chain (A-b)' in the graft-copolymer (A) has a carboxylic group neutralized with a base compound.

10. The aqueous dispersion of claim 1, wherein the graft-copolymer (A) comprises a plurality of the radical copolymerizable monomers (A-b), the plurality of monomers (A-b) defining a polymer chain (A-b)', and wherein the fine particles of the graft-copolymer (A) have a core-shell structure comprising the polyester (A-a) as a core and the polymer chain (A-b)' as a shell.

11. An aqueous dispersion comprising a graft-copolymer (A) dispersed in water or a mixed solvent (B) of water and a water-soluble organic solvent, the graft-copolymer (A) comprising a polyester (A-a) graft-polymerized with a plurality of radical copolymerizable monomers (A-b) comprising a radical copolymerizable monomer having a hydrophilic group, the plurality of monomers (A-b) defining a polymer chain (A-b)', wherein said graft-copolymer (A) is dispersed as fine particles having an average particle size of not more than 500 nm and a half band width of a signal of a carbon of a carbonyl group of the polyester, as determined by $^{13}$C-NMR, is not less than 300 Hz, wherein the graft copolymer (A) is obtained in a mixed solvent of an organic solvent which is water-soluble and a good solvent for the polyester (A-a) and an organic solvent which is water-soluble and a poor solvent for the polyester (A-a) and a good solvent for the polyester chain (A-b)'.

12. The aqueous dispersion of claim 11, wherein the weight ratio of the organic solvent which is water soluble and a good solvent for the polyester (A-a) to the organic solvent which is water soluble and a poor solvent for the polyester (A-a) and good solvent for the polymer chain (A-b)' is 95/5–10/90.

13. The aqueous dispersion of claim 1, wherein the graft-copolymer (A) comprises a plurality of the radical copolymerizable monomers (A-b), the plurality of monomers (A-b) defining a polymer chain (A-b)', and wherein each radical copolymerizable monomer (A-b) of the polymer chain (A-b)' has a copolymerization reactivity ratio to diethyl fumarate of from more than 1 to 12.

14. The aqueous dispersion of claim 1, comprising a plurality of the radical copolymerizable monomers (A-b) which define a polymer chain (A-b)' comprising a highly electron acceptive monomer (A-b) and a highly electron donative monomer (A-b), the each monomer (A-b) having a copolymerization reactivity ratio to diethyl fumarate of not more than 1.

15. The aqueous dispersion of claim 14, wherein the highly electron acceptive radical copolymerizable monomer (A-b) is maleic anhydride.

16. The aqueous dispersion of claim 1, wherein the average molecular weight of the polyester (A-a) is from 5,000 to 50,000.

* * * * *